(No Model.)

E. G. VAN ZANDT.
PNEUMATIC TIRE.

No. 597,569. Patented Jan. 18, 1898.

Witnesses:
G. A. Pennington
Hugh N. Wagner

Inventor
Edwin G. Van Zandt,
by Paul Bakewell and
F. R. Cornwall
his attys.

UNITED STATES PATENT OFFICE.

EDWIN G. VAN ZANDT, OF ST. LOUIS, MISSOURI, ASSIGNOR TO F. E. NIESEN, TRUSTEE, OF SAME PLACE.

PNEUMATIC TIRE.

SPECIFICATION forming part of Letters Patent No. 597,569, dated January 18, 1898.

Application filed July 12, 1897. Serial No. 644,234. (No model.)

*To all whom it may concern:*

Be it known that I, EDWIN G. VAN ZANDT, a citizen of the United States, residing at the city of St. Louis, State of Missouri, have invented a certain new and useful Improvement in Pneumatic Tires, of which the following is a full, clear, and exact description, reference being had to the accompanying drawings, forming part of this specification, in which—

Figure 1:
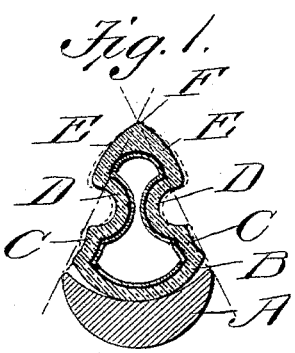
Figure 2:
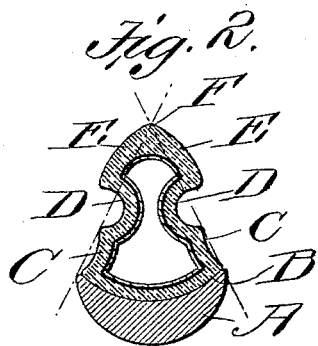

Figure 1 is a cross-sectional view of a tire embodying my invention, showing the same deflated in full lines and the shape the tire assumes when inflated in dotted lines. Fig. 2 is a similar view showing the position the tire assumes when inflated.

This invention relates to a new and useful improvement in tires for vehicles, and particularly to that class wherein air is introduced under pressure to maintain the shape of the tire and also afford a medium of support for the walls of the tire and give resiliency to the same.

The objects of the invention are to so construct a tire that it will not slip laterally when in contact with wet or slippery surfaces; to increase the traction qualities of tires of this class; to utilize the contained air to the best possible advantage; to so construct the tread that it will not pick up and throw mud, &c.; to afford a firm contact between the base of the tire and the concavity of the rim in which it is seated, whereby creeping and displacement are not liable to occur, and, finally, to construct a tire having the above qualifications in a simple, cheap, and durable manner.

With the above objects in view the invention consists in constructing a hollow tire, the material of which it is made being preferably rubber reinforced, if desired, by fabric, said tire having a narrow or pointed tread and provided with concavities or recurved portions in its sides, which when the tire is sustaining a weight will cause the side walls of the tire to move inwardly toward each other, taking the point or points of resiliency away from the point of contact with the ground and locating them between the point of contact with the ground and the point of support of the tire, preferably within the lines of pressure.

Another feature resides in the novel construction of the tire, as will hereinafter be more fully described, and afterward pointed out in the claims.

In the drawings, A indicates the wheel-rim, of any ordinary or approved form, the same having, as usual, a peripheral concaved seat for the tire.

B indicates the base of the tire, which when deflated is described from a circle of less radius than the concavity of the seat in the wheel-rim. The object of this is to accommodate the change of form or shape of the tire when air is introduced under pressure. The side walls C of the tire, near the base, are inclined toward each other at their outer ends and preferably curved so that in action they move toward each other, compressing the confined air between them.

D indicates recurved portions in the sides of the tire, which form oppositely-disposed curved side walls located almost entirely within the "lines of pressure," as I will term them, which are lines from point of contact of tread to extreme lateral points of support, as indicated by dotted lines in Fig. 2. These recurved portions of the side walls will move toward each other when pressure is placed on the tread, as is obvious, and be compressed, at the same time acting against the confined pressure of air within.

E indicates side walls leading from the outer extremities of the recurved portions D and preferably reversely curved with relation thereto. At the junction or apex of walls E is formed the tread F, which, as shown, is pointed; but it may be flattened somewhat, if desired, as is obvious.

The action of the side walls of this tire when pressure is placed on the tread is obvious. The walls E, where they join the recurved walls D, tend to spread. The tendency of the walls D is to counteract this, however, and by reason of the presence of walls C the walls D and C move inwardly. These opposing tendencies, each having a certain freedom of movement, render the tire most sensitive and resilient at points between the tread and support. The comparatively large surface area of wall B holds the tire firmly to its seat; but it may be found desirable in some instances to use cement as a permanent binding medium which will be active when the tire is deflated as well as when it is inflated. The lines of the tire, except the recurved walls D, are almost in line with the lines of pressure, which is advantageous in that said walls may be made comparatively light to carry required loads. The wedge shape of the tire is also advantageous, because it has been found by experience that a tire constructed as shown in the drawings is not liable to pick up and throw mud, &c., and impossible to side slip.

Suitable fabric is introduced to strengthen the rubber, if desired, as is well understood.

Having thus described my invention, what I claim, and desire to secure by Letters Patent, is—

1. A tire composed of a base-wall B, side walls C, recurved portions D, and converging walls E, the latter, at their point of juncture, forming the tread whereby, when said tread is pressed inwardly, the side walls and recurved portions move inwardly toward each other, substantially as described.

2. A tire composed of a base-wall and side walls which converge toward each other forming a peripheral tread, said side walls being formed with inwardly-curved portions, whereby when the tread is pressed inwardly, the inwardly-curved portions of the side walls move inwardly toward each other, substantially as described.

In testimony whereof I hereunto affix my signature, in the presence of two witnesses, this 3d day of July, 1897.

EDWIN G. VAN ZANDT.

Attest:
BELLE G. HAMILTON,
NELLIE MOULDER.